(12) United States Patent
Hill

(10) Patent No.: US 8,828,163 B2
(45) Date of Patent: Sep. 9, 2014

(54) HOUSING FOR AIRCRAFT MOUNTED COMPONENTS

(75) Inventor: John Leslie Paul Hill, West Springfield, MA (US)

(73) Assignee: PTI Industries, Inc., Enfield, CT (US)

( * ) Notice: Subject to any disclaimer, the term of this patent is extended or adjusted under 35 U.S.C. 154(b) by 1219 days.

(21) Appl. No.: 12/720,051

(22) Filed: Mar. 9, 2010

(65) Prior Publication Data

US 2011/0221626 A1   Sep. 15, 2011

(51) Int. Cl.
| | | |
|---|---|---|
| B32B 41/00 | (2006.01) | |
| H01Q 1/42 | (2006.01) | |
| G01S 13/93 | (2006.01) | |
| H01Q 1/28 | (2006.01) | |
| B64C 7/00 | (2006.01) | |

(52) U.S. Cl.
CPC .. *B64C 7/00* (2013.01); *H01Q 1/42* (2013.01); *G01S 13/9303* (2013.01); *H01Q 1/28* (2013.01)
USPC ............... 156/64; 156/60; 156/350; 156/378; 156/379; 156/293

(58) Field of Classification Search
CPC ......... H01Q 1/405; H01Q 1/42; H01Q 1/421; H01Q 1/427; H01Q 1/428
USPC .............. 156/60, 64, 350, 378, 379, 293
See application file for complete search history.

(56) References Cited

U.S. PATENT DOCUMENTS

| | | | | |
|---|---|---|---|---|
| 4,620,890 | A | * | 11/1986 | Myers et al. .................. 156/196 |
| 5,049,217 | A | * | 9/1991 | Forler ............................. 156/64 |
| 5,175,601 | A | * | 12/1992 | Fitts .............................. 356/604 |
| 5,805,111 | A | | 9/1998 | Brettner, III et al. |
| 5,971,046 | A | * | 10/1999 | Koch et al. ................. 152/152.1 |
| 6,945,111 | B2 | * | 9/2005 | Georgeson ..................... 73/600 |
| 7,385,560 | B1 | | 6/2008 | Maloratsky et al. |
| 7,443,334 | B2 | | 10/2008 | Rees et al. |
| 7,492,307 | B2 | | 2/2009 | Coulmeau |
| 2008/0277058 | A1 | * | 11/2008 | Schmier et al. ............ 156/307.1 |

\* cited by examiner

*Primary Examiner* — Philip Tucker
*Assistant Examiner* — Joshel Rivera
(74) *Attorney, Agent, or Firm* — Cantor Colburn LLP

(57) ABSTRACT

A traffic collision avoidance system device is provided. The device includes a radome having an antenna contained therein. A chassis is bonded to the radome by a layer of bonding material about the chassis periphery. A housing is provided having a substantially flat bottom portion and a wall extended about a periphery to define a interior portion. A second bonding layer disposed between the housing and the radome within the interior portion to form a seal.

16 Claims, 8 Drawing Sheets

HOUSING FOR AIRCRAFT MOUNTED COMPONENTS

BACKGROUND OF THE INVENTION

The subject matter disclosed herein relates in general to a housing for mounting components to an exterior of an aircraft, and in particular to a housing for traffic collision avoidance system (TCAS) type devices that minimizes or prevents the occurrence of corrosion due to environmental contaminants.

In areas of congested airspace or low visibility, it is desirable for a pilot of one aircraft to be warned of the presence of a nearby aircraft so the respective aircraft may maneuver the aircraft to avoid collision. One device, known as a traffic collision avoidance system (TCAS) employs a transponder mounted on the aircraft that communicates with transponders on nearby aircraft. In this way, the aircraft control systems automatically communicate and provide the pilots with appropriate and timely information about nearby aircraft.

TCAS devices are typically mounted on the external surface of the aircraft. In a typical configuration, a commercial aircraft will have two TCAS devices, one mounted on the underside of the aircraft and one mounted on the top side in an area adjacent to the cockpit. The TCAS device has three major components, a metal chassis, a polymer radome, and an antenna assembly. Bonding material is applied about the periphery of the chassis to couple the radome to the chassis and seal the antenna assembly from the external environment.

Since the TCAS devices are mounted on the outside of the aircraft, the devices need to operate over a wide environmental temperature range, typically on the order of −67° F. to 158° F. (−55 C to 70 C). This wide range of operating temperatures places a great deal of stress on the components of the TCAS device. In particular, the bonding layer between the chassis and the radome is subjected to stresses due to the disparity between the coefficients of thermal expansion of the chassis and the radome. Repeated thermal cycling of the TCAS device may then result in a breach in the bonding layer allowing condensation to migrate into the interior portion of the TCAS device. The entry of the condensation may then result in corrosion of the chassis and antenna assembly.

While existing TCAS devices are suitable for their intended purposes, there remains a need for improvements. In particular, there remains a need for improvements in minimizing or preventing the infiltration of water and other environmental contaminants into the interior of the TCAS device.

BRIEF DESCRIPTION OF THE INVENTION

According to one aspect of the invention, a traffic collision avoidance system (TCAS) device is provided. The TCAS device includes a radome having an antenna. A chassis is bonded to the radome about a periphery. A housing is provided having a substantially flat bottom portion with a wall that extends about a periphery to define an interior portion. A bonding layer is disposed between the housing and the radome within the interior portion.

According to another aspect of the invention, a method of producing a device that will be mounted to an exterior of an aircraft is provided. The method includes the step of generating a three-dimensional profile of an assembly. An interior portion of a housing is formed to substantially match the profile. A first bonding material is applied to the interior portion. The assembly is inserted into the interior portion. Finally, the first bonding material is cured.

According to yet another aspect of the invention, a housing for a device that is mounted to an exterior of an aircraft is provided. The housing has a substantially planar surface. The planar surface having a first side, a second side opposite said first side, and a first end arranged between the first side and the second side. A wall is arranged to extend about a periphery of the planar surface, the wall and the planar surface being sized to receive a device. A first opening arranged is in the planar surface and a seal disposed about the first opening.

According to yet another aspect of the invention, a device for mounting to an exterior of an aircraft is provided that is produced according to the methods described herein.

According to yet another aspect of the invention, a TCAS device is provided that is produced according to the methods described herein.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
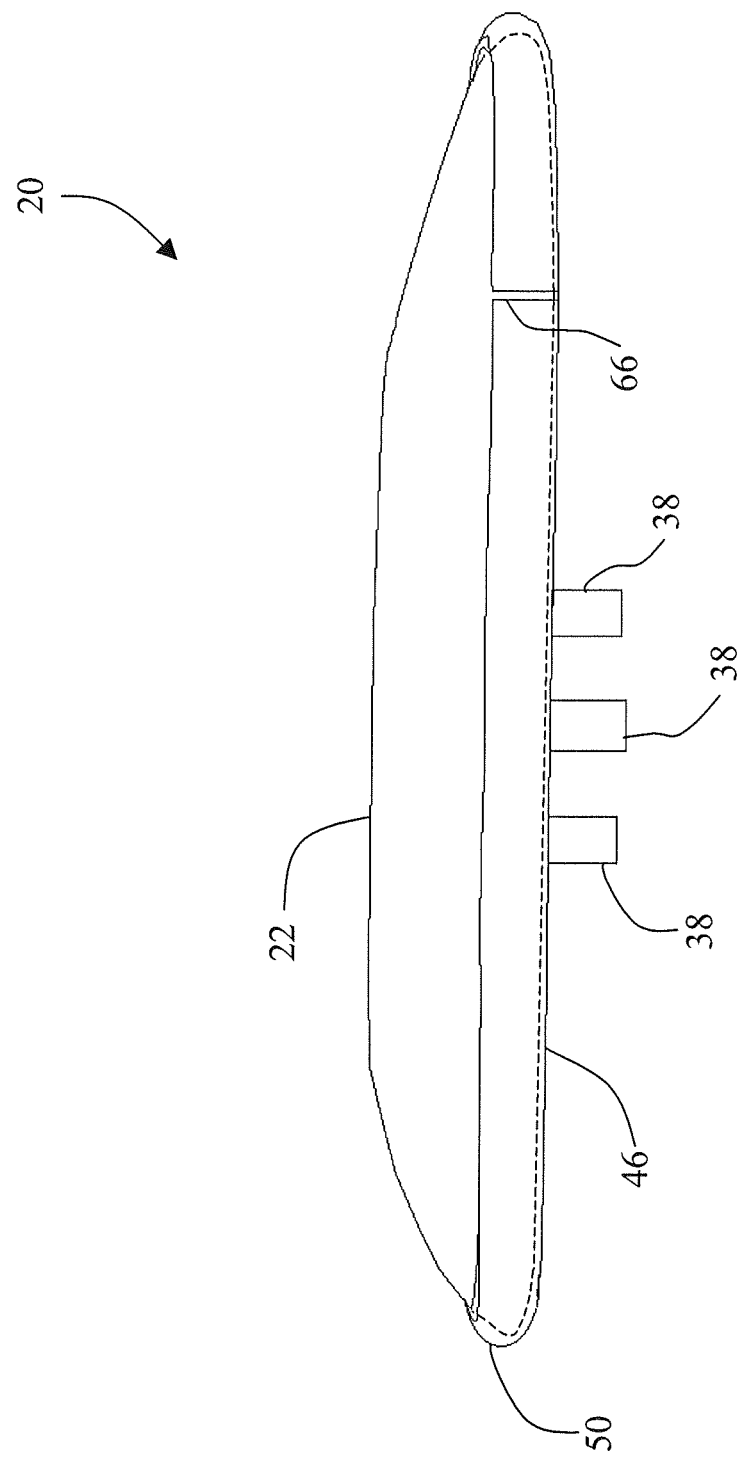
FIG. 1 is a side view of a traffic collision avoidance system (TCAS) device in accordance with an embodiment of the invention.
Figure 2:
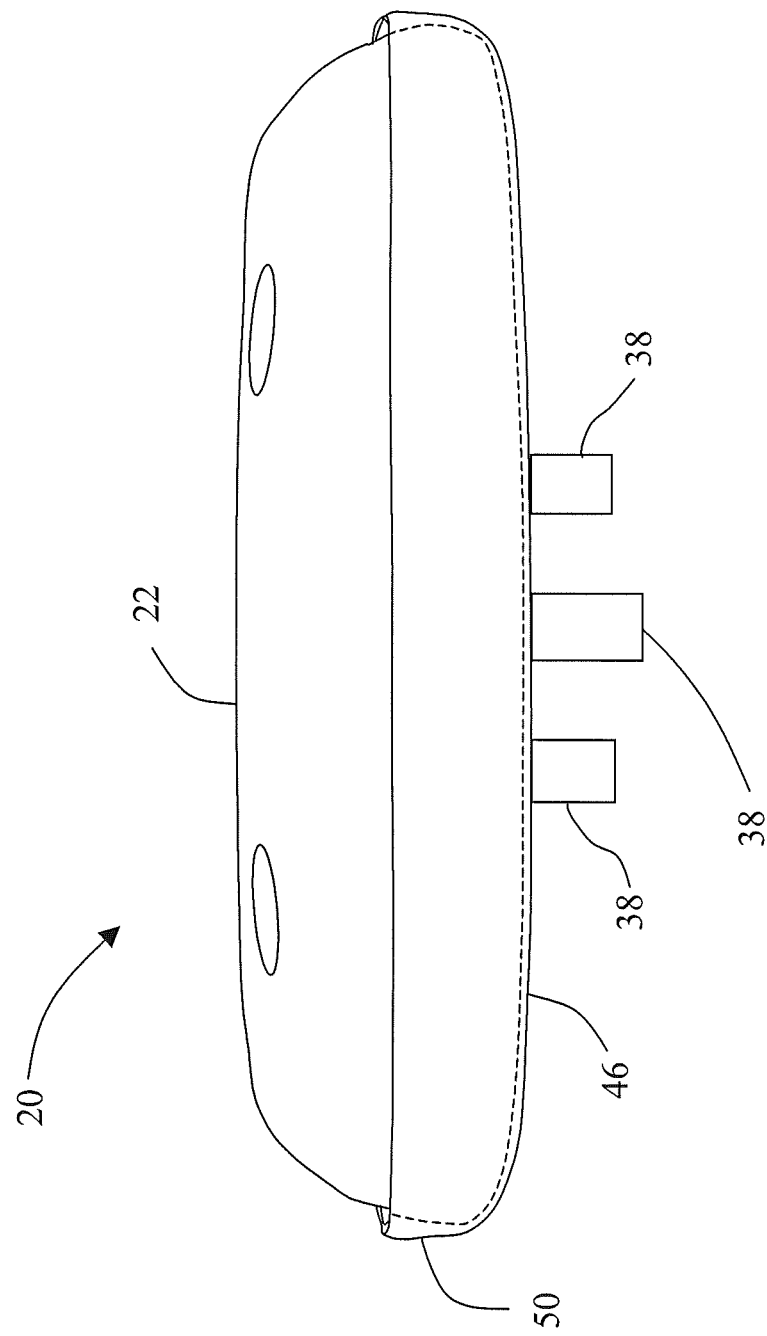
FIG. 2 is a front view of the TCAS device of FIG. 1.
Figure 3:
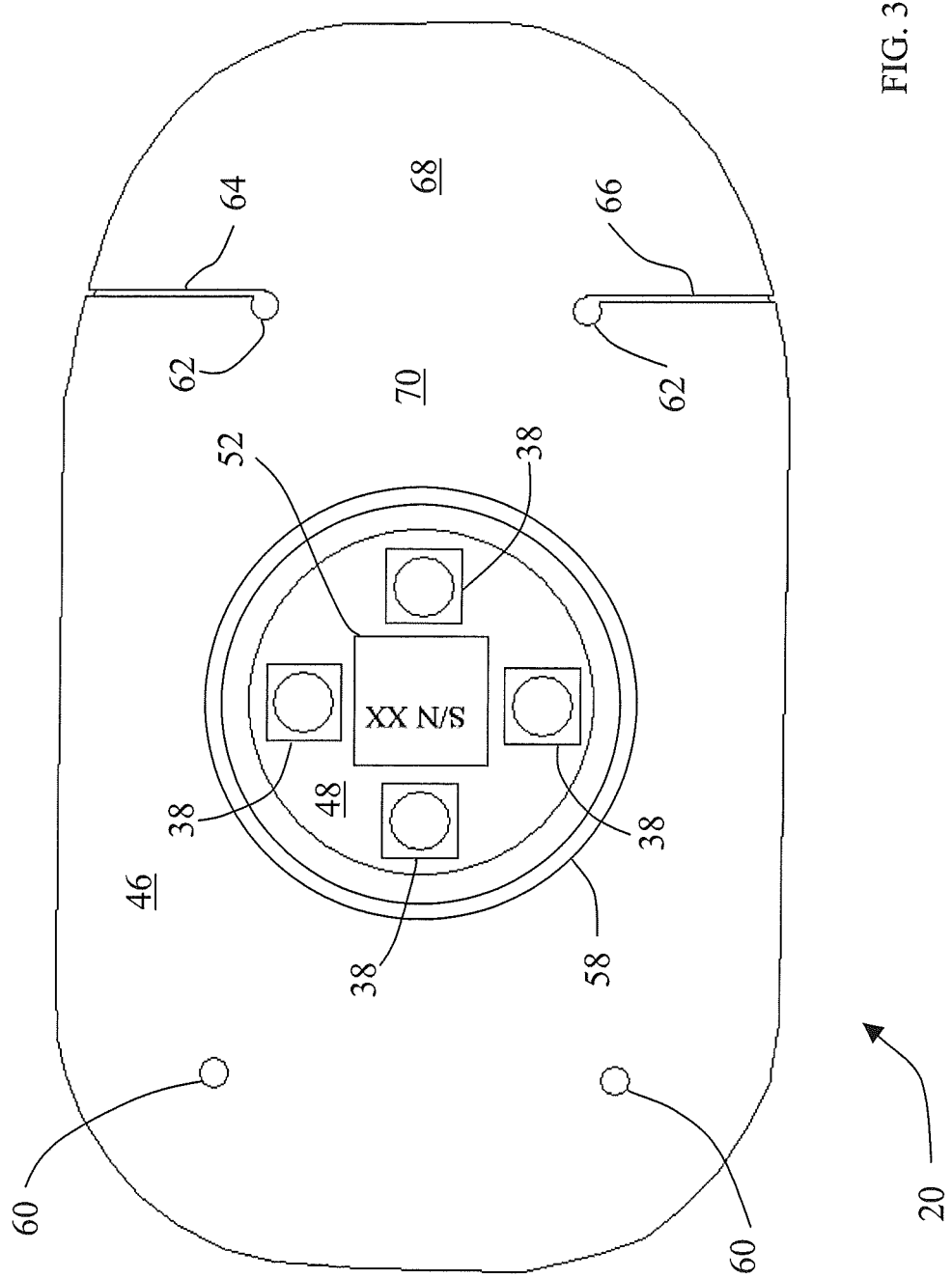
FIG. 3 is a bottom view of the TCAS device of FIG. 1.
Figure 4:
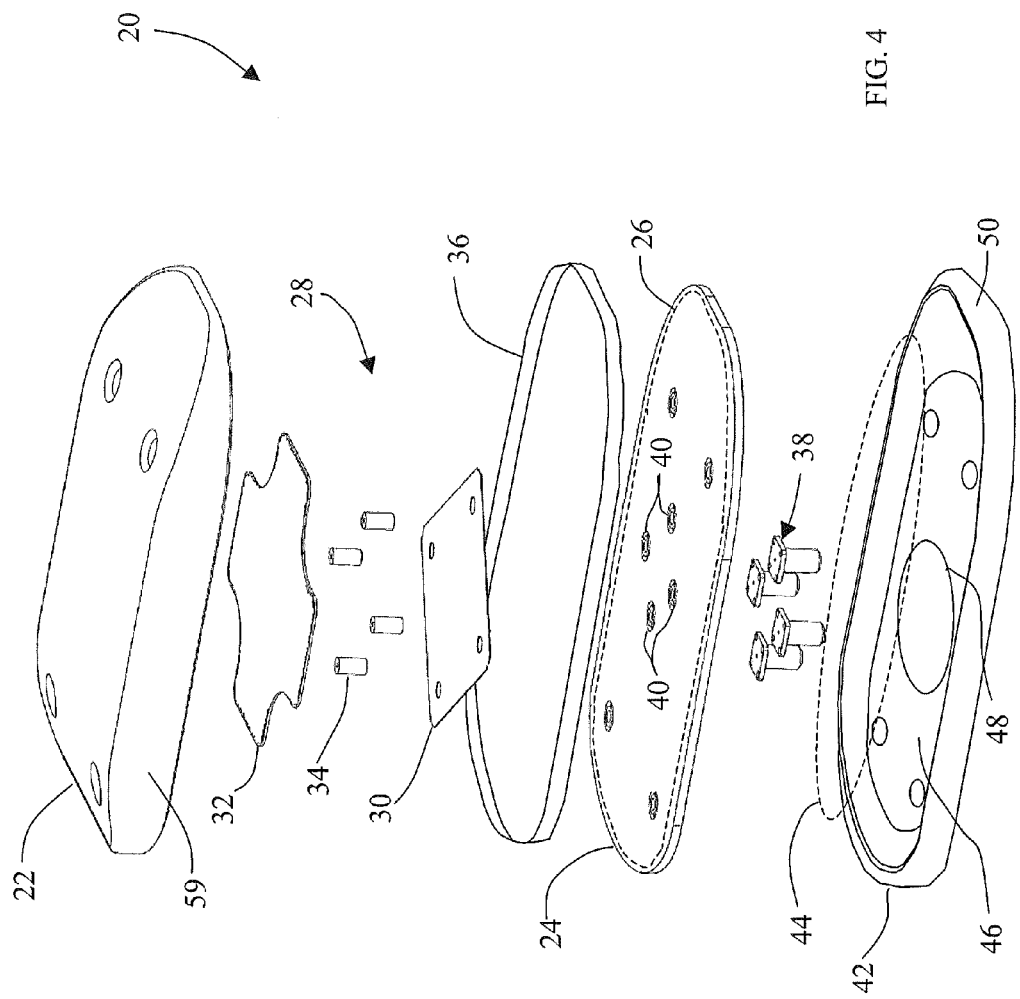
FIG. 4 is a partial exploded view of the TCAS device of FIG. 1.
Figure 5:
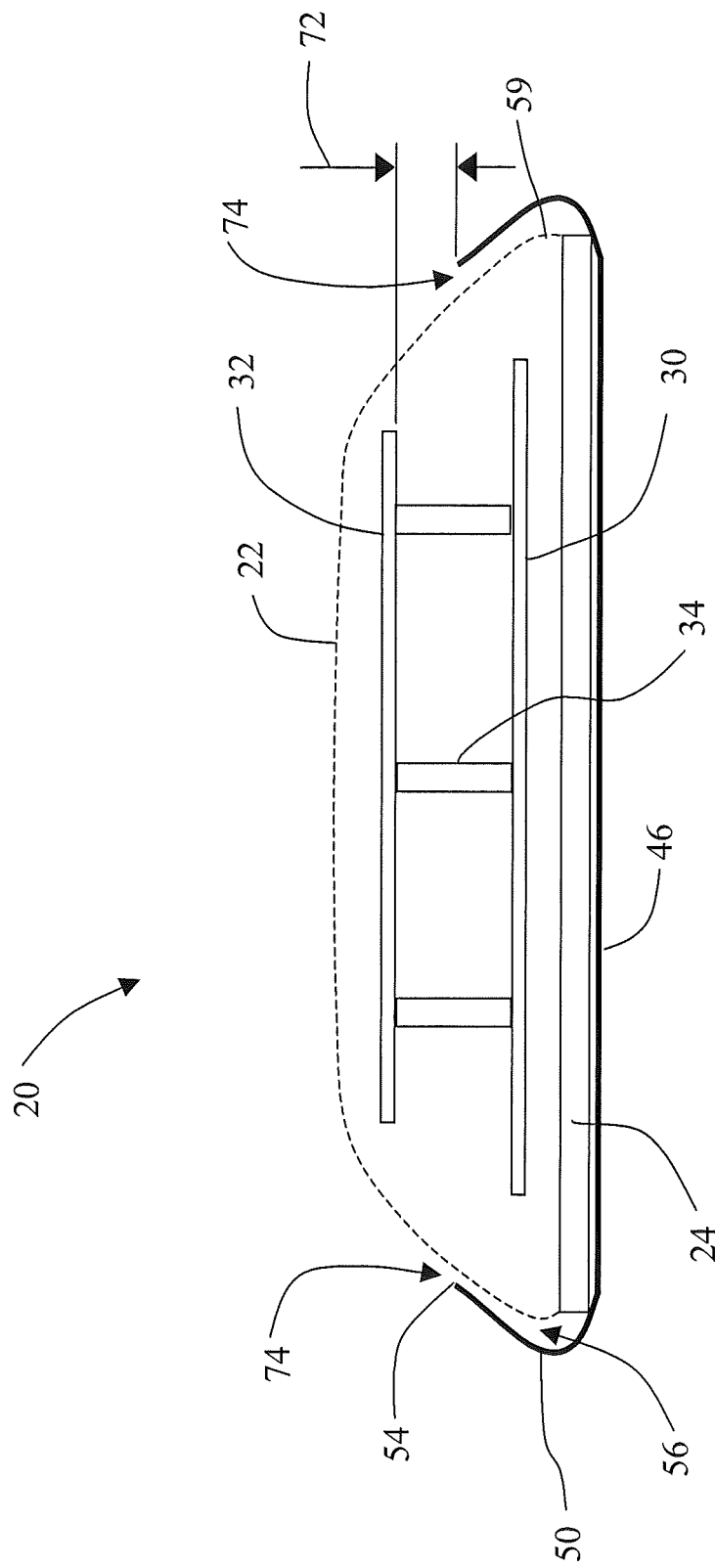
FIG. 5 is a partial sectional view of the TCAS device of FIG. 1.

The detailed description explains embodiments of the invention, together with advantages and features, by way of example with reference to the drawings.

DETAILED DESCRIPTION OF THE INVENTION

An exemplary embodiment of a traffic collision avoidance system (TCAS) TCAS device 20 is illustrated in FIGS. 1-6. As will be discussed in more detail herein, the TCAS device 20 includes a housing and a bonding layer that have a coefficient of thermal expansion (CTE) that is substantially similar or equal to the CTE of the TCAS device 20 radome. The TCAS device 20 further provides advantages in allowing assembly of the radome to a housing having an undercut portion that further inhibits entry of environmental contaminants. The TCAS device 20 provides number of advantages in preventing corrosion to increase reliability and to extend useful operating life of the TCAS device 20.

It should be appreciated that while the exemplary embodiment makes reference to a TCAS device 20, the claimed invention should not be so limited. The TCAS device 20 may also be a wide angle augmentation system (WAAS), a European geostationary navigation overlay service (EGNOS), a multi-functional satellite augmentation system (MSAS), or other type of navigation augmentation system for aircraft. Further, in some embodiments, the TCAS device 20 may be any device having a sealed interior portion that is mounted to the external fuselage of an aircraft.

The TCAS device 20 includes a radome 22 mounted to a chassis 24. In the exemplary embodiment, the chassis 24 is made from an aircraft grade aluminum alloy, such as 6061 for example. The radome 22 may be made from polymer materials such as polyethersulfone (PES) cover layer with urethane foam body. A first bonding layer 26 is disposed on the chassis 24 to couple the radome 22 and chassis 24 and forming a seal to protect the antenna assembly 28. In one embodiment, a second fiberglass bonding layer 36 encompasses the periphery of the chassis 24 and the radome 22 to further seal the chassis-radome assembly 22, 24. The antenna assembly 28 typically includes a printed circuit board 30 and an antenna 32 that are separated by standoffs 34. In one embodiment, the printed circuit board 30 is bonded to chassis 24.

A plurality of terminals or connectors 38 are coupled to the printed circuit board 30 opposite the antenna 32. The connectors 38 pass through openings 40 in the chassis 24. The connectors 38 couple with conductors (not shown) in the aircraft to transmit signals between the TCAS device 20 and the aircraft's control systems (not shown).

The TCAS device further includes a housing 42. In the exemplary embodiment, the housing 42 is made from a suitable polymer material, such as polyethersulfone (PES) for example, that has a similar CTE to the radome 22. The housing 42 is coupled to the chassis 24 and the radome 22 by a second bonding layer 44. In the exemplary embodiment, the second bonding layer 44 is made from an epoxy resin, such as Master Bond EP30LTS manufactured by Master Bond, Inc. It is desirable to that the bonding layer 44 material have a low temperature cure and have a CTE that is similar to the radome 22. In one embodiment, the second bonding layer 44 has a CTE of 12.0 µm/m ° C. and is substantially similar to fiberglass bonding layer 36 CTE of 12.8 µm/m ° C. In one embodiment, the second bonding layer 44 obtains a maximum shear strength with a 0.003 inch to 0.005 inch (0.0762 mm-0.127 mm) bond line. It should be appreciated that while the second bonding layer 44 is illustrated as a ring, this is for clarity purposes. In the exemplary embodiment, the bonding layer 44 covers the entire inner surface of the housing 42.

The housing 42 includes a substantially flat planar portion 46 having an opening 48. It should be appreciated that the opening 48 aligns with the openings 40 to allow the connectors 38 to exit the TCAS device 20. In one embodiment, the opening 48 is large enough to allow a serial number tag 52 on the chassis 24 to be visible. Arranged about the opening 48 is a seal 58. When installed on the aircraft, the seal 58 contacts the aircraft fuselage forming a barrier that prevents the infiltration of water and other contaminants. In the exemplary embodiment, the seal 58 is an o-ring molded into the planar portion 46. In another embodiment, the planar portion 46 includes a slot sized to receive an o-ring.

A wall 50 extends about the periphery of planar portion 46. In the exemplary embodiment, the wall 50 is arranged on an angle such that a lip 54 of the wall 50 is positioned inward (e.g. closer to the center of the housing 42) from the outer perimeter of the housing 42. In one embodiment, the angle of the wall 50 is an acute angle. The angling of wall 50 forms an undercut area 56 and in the exemplary embodiment, the outer perimeter 59 of the radome 22 extends into the undercut area 56. In the exemplary embodiment, the wall 50 is a compound angle that varies about its periphery, with the angle varying between just less than 90 degrees to less than 30 degrees. In one embodiment, when the radome 22 and chassis 24 are assembled, the second bonding layer 44 flows or is displaced into any gap 74 that may exist between the lip 54 and the radome 22.

The wall 50 and undercut area 56 extend about the full circumference of the chassis 24 and radome 22. This arrangement forms a lap joint that encapsulates the chassis 24 allowing a significantly larger bonding surface for the second bonding layer 44 compared to the first bonding layer 26. In the exemplary embodiment, this arrangement provides for 60 in$^2$ (0.0387 m$^2$) of bond surface for the second bonding layer 44 compared to 8 in$^2$ (0.0052 m$^2$) for the first bonding layer 26. It should be appreciated that this increase in the bonding surface provides for a significantly more reliable sealing arrangement to minimize or prevent the migration of water or other environmental contaminants to the antenna assembly 28.

A plurality of holes 60, 62 is formed in the planar portion 46. The holes 60, 62 are coaxial with other holes in the chassis 24 and radome 22. The holes 60, 62 are sized to receive bolts that couple the TCAS device 20 to the aircraft. Extending from each hole 62 is a slot 64, 66. The slots 64, 66 extend from the holes 62 towards the sides of the housing 42 adjacent their respective holes 62. The slots 64, 66 extend along the wall 50 to the lip 54. These slots 64, 66 provide a relief that separates the housing into a first portion 68 and a second portion 70. Since the housing 42 is made from a polymer material, the slots 64, 66 allow the first portion 68 to flex or bend during the assembly process to provide clearance for the radome 22 and chassis 24 assembly to be inserted to the housing 42 and the undercut area 56 without interference from wall 50. It should be appreciated that the second bonding layer 44 will flow or be displaced into the slots 64, 66 to form a seal that may minimize or prevent the migration or infiltration of environmental contaminants, such as water for example, into the interior portions of the TCAS device 20.

In one embodiment, the wall 50 is arranged to have a height such that the antenna 32 is spaced a distance 72 from the lip 54. It should be appreciated that by positioning the antenna 32 apart from the lip 54, the housing 42 should not interfere with the transmission or reception of signals from other.

Figure 6:
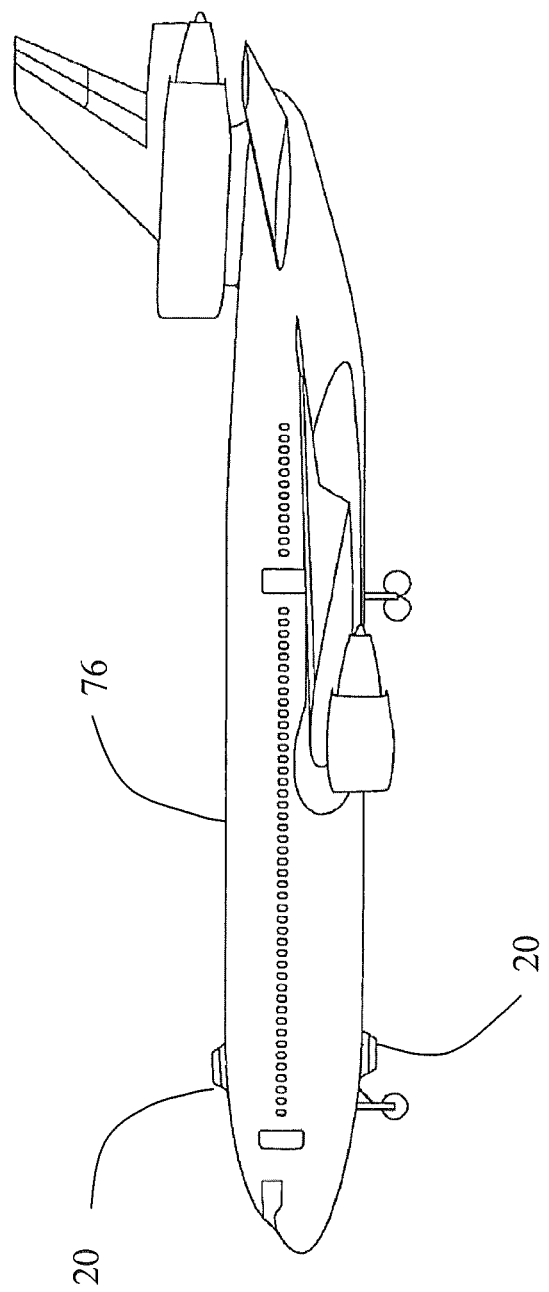
FIG. 6 is a side elevation view of an aircraft having the TCAS device of FIG. 1.

An exemplary embodiment of an application for the TCAS device is shown in FIG. 6. In this embodiment, the TCAS device 20 may be installed on an aircraft 76. The TCAS device may be disposed on the top or the bottom of the fuselage of the aircraft 76 or other areas that are not shielded from radar interrogation.

Figure 7:
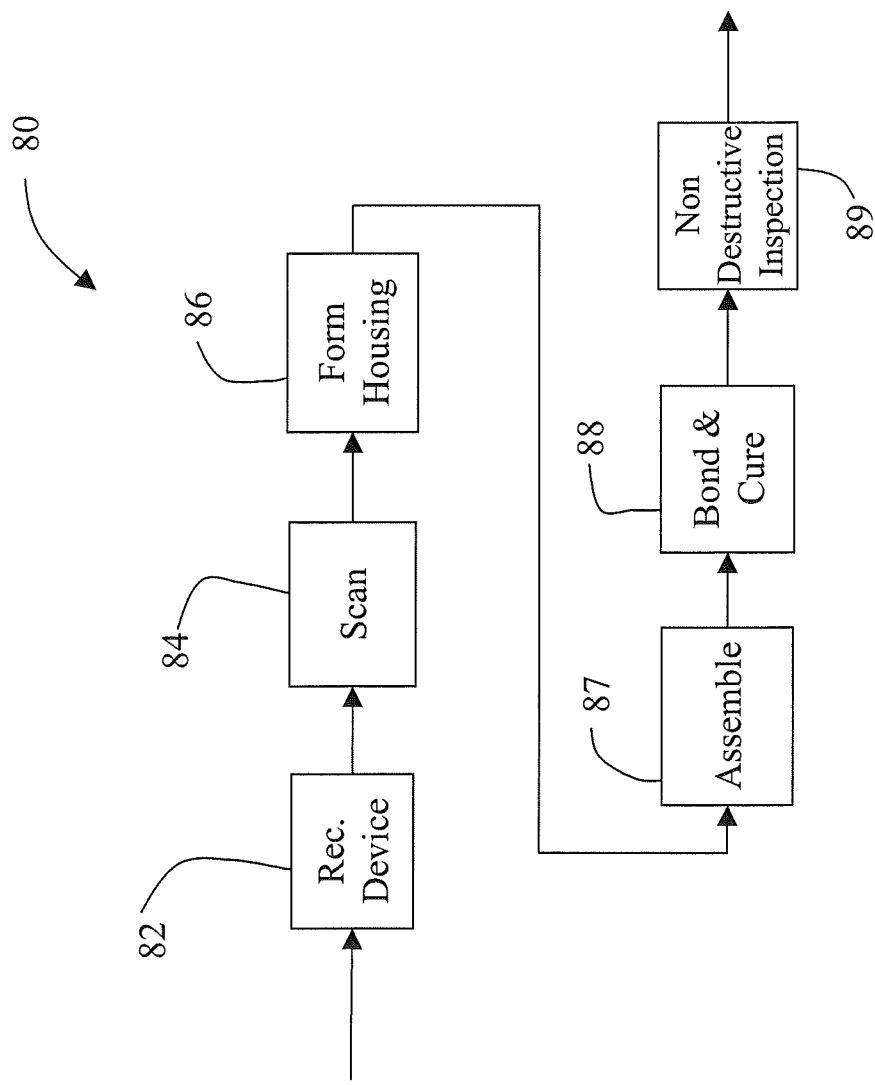
FIG. 7 is a flow diagram of a process for producing a TCAS device.

An exemplary process 80 for producing the TCAS device 20 is illustrated in FIG. 7. The process 80 starts by receiving the assembled chassis 24 and radome 22 in block 82. The process 80 then moves to block 84 where a coating and a cover (sometimes referred to as a "poly boot", not shown) are removed from chassis 24 and radome 22. The assembled chassis 24 and radome 22 are scanned to generate a three-dimensional profile of the assembly 22, 24. The scanning may be accomplished by any suitable measurement device, such as a laser scanner or a coordinate measurement machine for example. Next, the process 80 moves to block 86 where the housing 42 is formed. In the exemplary embodiment, the forming process 86 uses the three-dimensional profile to form the interior portion of the housing 42 including the undercut area 56. The forming process may be any process that allows the interior of the housing 42 to conform with the outer surface of the chassis-radome assembly 22, 24. In the exemplary embodiment, the interior portion of the housing 42 is formed by machining with the wall of the interior portion having an offset from the shape of the chassis-radome assembly sized to provide a desired adhesive bond line.

Finally, the second bonding layer 44 is applied and the chassis-radome assembly 22, 24 is assembled into the housing 42 in block 87. In some embodiments, prior to applying the bonding layer, a surface treatment, such as Sol-Gel (AC-130) manufactured by Advanced Chemistry and Technology, Inc. for example, may be applied. As discussed above, the slots 64, 66 allow the first portion 68 to be deflected allowing the chassis-radome assembly 22, 24 to be inserted into the housing 42. The bonding layer 44 flows or is displaced into the slots 64, 66 and the gap 74. The bonding layer 44 is then cured in block 88. In the exemplary embodiment, the curing of bonding layer 44 occurs at a low temperature, such as at ambient temperature for seven days for example. In another embodiment, the curing is performed at a slightly elevated temperature, such as 150° F. (65.6 C) for 120 minutes for example. In the exemplary embodiment, the bonding layer 44 is inspected using a non-destructive test procedure in block 89, such as a phased array ultrasonic testing process for example. If a dis-bonding region is uncovered by the non-destructive testing, holes, such as 0.125 inch (3.175 mm) for example, will be formed at the location of the dis-bond. The holes are filled with epoxy resin to repair the dis-bond region and the holes such that the resin is flush with the outer surface.

Figure 8:
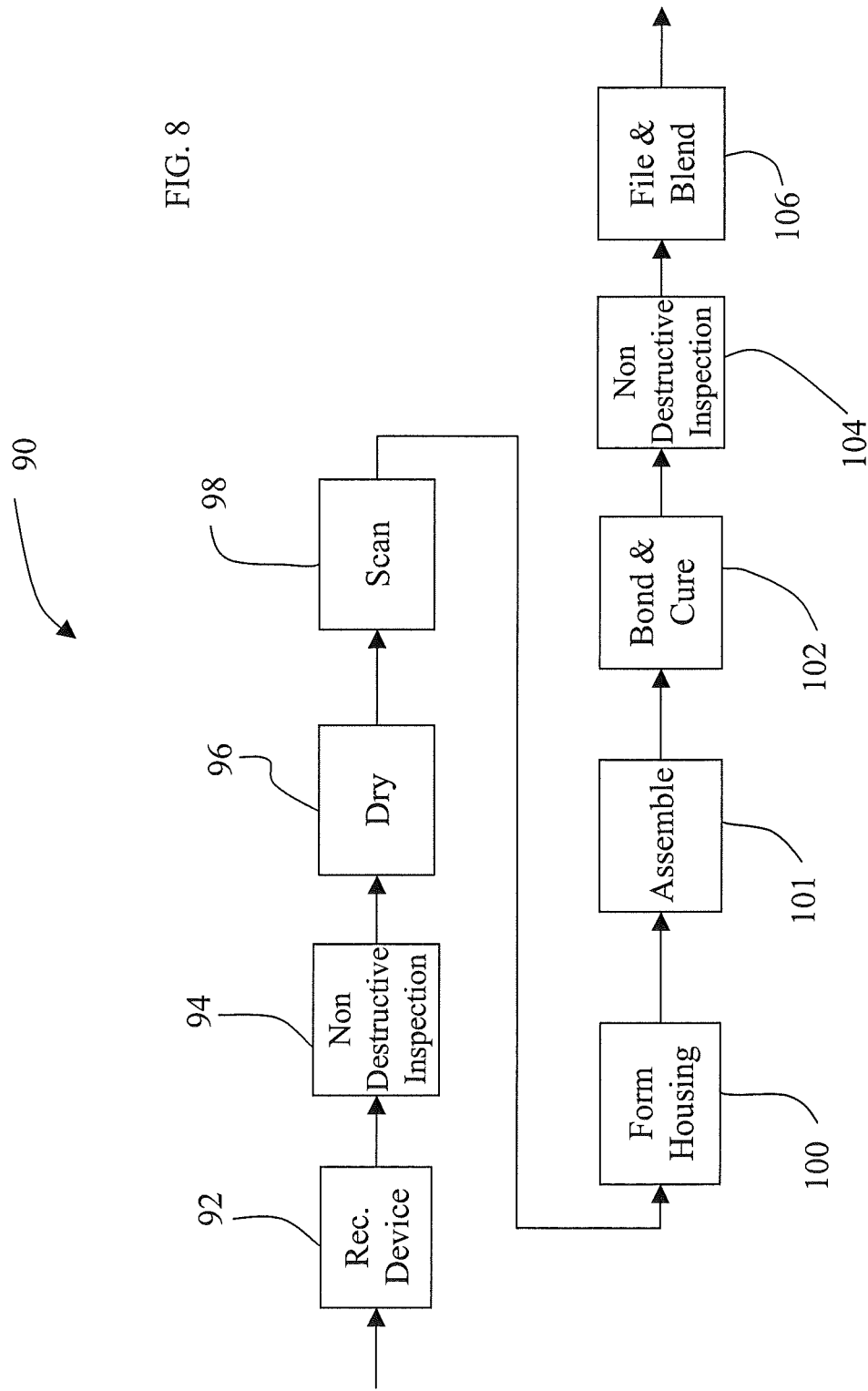
FIG. 8 is a flow diagram of another embodiment of a process for producing a TCAS device.

Another process 90 for producing the TCAS device 20 is illustrated in FIG. 8. In this embodiment, the process 90 receives the chassis-radome assembly 22, 24 in block 92. In some embodiments, the receipt of the chassis-radome assembly 22, 24 also includes the removal of any coatings and an external cover or "poly boot" The chassis-radome assembly 22, 24 is then inspected in block 94 using a nondestructive testing process to determine if there is any break in the first bonding layer 26. In the exemplary embodiment, the nondestructive testing is performed using a phased array ultrasonic testing process. If a dis-bonding region is uncovered by the non-destructive testing, holes, such as 0.125 inch (3.175 mm) for example, will be formed at the location of the dis-bond. The holes are filled with a resin adhesive to repair the dis-bond region. In one embodiment, a minimum of two 0.125 inch (3.175 mm) holes are formed at the dis-bond location. After forming the holes, fiberglass resin is inserted to substantially fill the dis-bonded areas and the holes. A sufficient amount of resin is used such that once the resin has cured, it is flush with the outer surface.

Next, the process 90 moves to block 96 where the chassis-radome assembly 22, 24 is dried. In the exemplary embodiment, the drying process is performed in a vacuum environment, such as at a pressure of 28-29 inches of mercury for example. In one embodiment, 4 holes (not shown), such as a 0.25 inch (6.35 mm) diameter hole for example, is formed in the chassis 24 to facilitate drying of internal areas of the chassis-radome assembly 22, 24. Once the drying process is completed, the process 90 moves to block 98 where a three-dimensional profile of the chassis-radome assembly 22, 24 is generated and stored on a computer medium as a computer readable file With the profile generated the process 90 moves to block 100 where the housing 42 is formed to provide an inner portion that closely matches the outer surface of the chassis-radome assembly 22, 24. Once the housing 42 is formed, the second bonding layer 44 is applied and the chassis-radome assembly 22, 24 is inserted into the housing 42 in block 101. The second bonding layer 44 is cured in block 102. As discussed above, it is desirable to cure the second bonding layer 44 at a low (ambient) temperature, or at a temperature (150° F., 65.6 C) elevated slightly above ambient. The TCAS device 20 is next inspected using a non-destructive inspection in block 104, such as the aforementioned phased array ultrasonic testing for example, to determine the quality of the second bonding layer 44. As discussed above, if a dis-bonding region is uncovered by the non-destructive testing, holes, such as 0.125 inch (3.175 mm) for example, will be formed at the location of the dis-bond. The holes are filled with epoxy resin to repair the dis-bond region. Finally, the bonding layer 44 in the area adjacent the lip 54 is filed and blended in block 106 to provide a smooth contour on the outer surface.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to create a three dimensional profile of a radome-chassis assembly and using the profile to form a housing interior that substantially conforms to the radome-chassis assembly.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A method of producing a device that will be mounted to an exterior of an aircraft comprising:
  generating a three-dimensional profile of a radome configured to operably couple with said aircraft;
  forming an interior portion of a housing to substantially match said profile, the housing being formed with a planar portion and a wall extending about a periphery of said planar portion, said wall being angled toward a center of the housing to define an undercut portion of said interior portion, said undercut portion being sized and positioned to receive a periphery of the radome;
  applying a first bonding material to said interior portion;
  inserting said radome into said interior portion; and,
  curing said first bonding material.

2. The method of claim 1 further comprising:
ultrasonically inspecting a second bond arranged between a first component and a second component of said radome;
determining a location of a disbonded area;
forming an opening at the location of the disbonded area;
filling the opening and disbonded area with a second bonding material; and,
drying said assembly.

3. The method of claim 2 further comprising:
ultrasonically inspecting said first bonding material; and,
shaping a portion of said first bonding material between a lip of said housing and said second component.

4. A method of producing a device that will be mounted to an exterior of an aircraft comprising:
generating a three-dimensional profile of an assembly;
forming an interior portion of a housing to substantially match said profile;
applying a first bonding material to said interior portion;
inserting said assembly into said interior portion;
curing said first bonding material;
ultrasonically inspecting a second bond arranged between a first component and a second component of said assembly;
drying said assembly;
ultrasonically inspecting said first bonding material;
shaping a portion of said first bonding material between a lip of said housing and said second component; and
wherein said curing of said first bonding material is performed at ambient temperature for a period of seven days.

5. The method of claim 4 wherein said drying of said assembly is performed at a pressure of 28-29 inches of mercury.

6. The method of claim 5 wherein said three-dimensional profile is generated using a laser scanner.

7. The method of claim 1 further comprising forming a first slot and an opposing second slot adjacent an end of said housing.

8. A method of producing a device that will be mounted to an exterior of an aircraft comprising:
generating a three-dimensional profile of a radome configured to operably couple with said aircraft;
forming an interior portion of a housing to substantially match said profile, the housing being formed with a wall extending about a periphery of said interior portion, said wall defining an undercut portion of said interior portion;
applying a first bonding material to said interior portion;
inserting said radome into said interior portion;
curing said first bonding material;
forming a first slot and an opposing second slot adjacent an end of said housing; and
rotating a first portion of said housing from a first position to a second position prior to inserting said radome into said interior portion.

9. The method of claim 8 further comprising forming an opening in a flat portion of said housing.

10. The method of claim 9 wherein said first slot and said second slot extend from said flat portion through said wall.

11. The method of claim 8 further comprising rotating said first portion from said second position to said first position after inserting said radome.

12. The method of claim 4 further comprising forming a first slot and an opposing second slot adjacent an end of said housing.

13. The method of claim 12 further comprising rotating a first portion of said housing from a first position to a second position prior to inserting said assembly into said interior portion.

14. The method of claim 13 further comprising forming an opening in a flat portion of said housing.

15. The method of claim 12 wherein said first slot and said second slot extend from said flat portion through said wall.

16. The method of claim 13 further comprising rotating said first portion from said second position to said first position after inserting said assembly.

* * * * *